T. KEENAN.
AUTOMATIC FEED WATER REGULATOR.
APPLICATION FILED AUG. 8, 1917.

1,277,602.

Patented Sept. 3, 1918.

INVENTOR
Thomas Keenan
BY
Hauff Garland
ATTORNEYS

UNITED STATES PATENT OFFICE.

THOMAS KEENAN, OF BROOKLYN, NEW YORK.

AUTOMATIC FEED-WATER REGULATOR.

1,277,602.    Specification of Letters Patent.    Patented Sept. 3, 1918.

Application filed August 8, 1917. Serial No. 185,168.

*To all whom it may concern:*

Be it known that I, THOMAS KEENAN, a citizen of the United States, residing at Brooklyn, in the county of Kings and State of New York, have invented new and useful Improvements in Automatic Feed-Water Regulators, of which the following is a specification.

This invention relates to a device in which a spring controlled valve is normally held open by the weight of a float, and closed when the fluid reaches a certain level for raising the float.

The invention is designed to provide a number of levers to support the float and lift the valve off its seat against the action of a coiled spring.

The object of the invention is to provide a passage having an inlet and an outlet for flushing the valve to carry away any sediment accumulating about the inlet passage or valve seat.

The invention also includes a float in which a plurality of annular tubes are arranged together so that when any of the tubes becomes punctured, the remainder will be buoyant enough to remain afloat.

The novel features of the invention are more fully described in the following specification and claims, and illustrated in the accompanying drawing in which:

Figure 1:
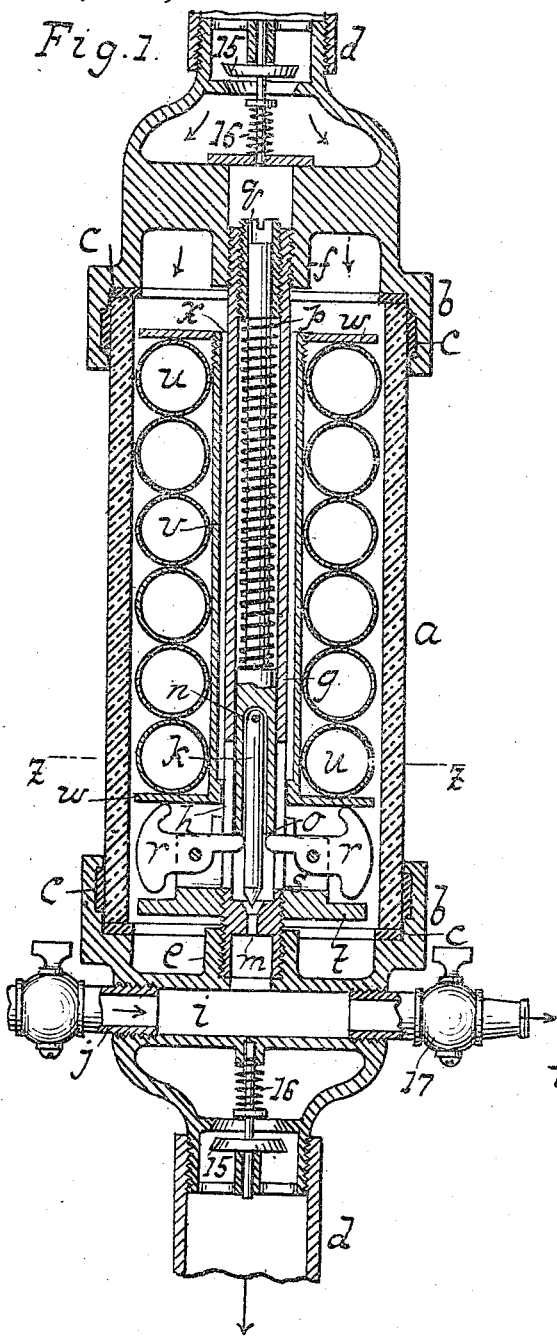
Figure 1 represents a sectional side elevation of a regulator embodying this invention.
Figure 2:
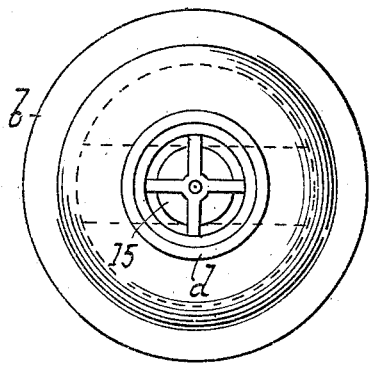
Fig. 2 is a plan view of the same.
Figure 3:
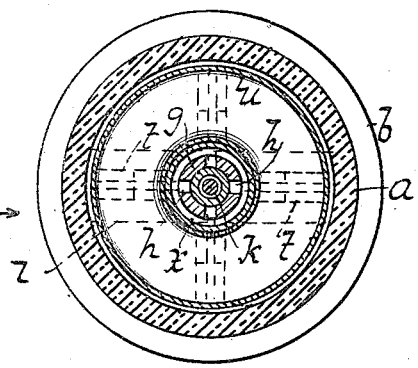
Fig. 3 is a horizontal section taken along the line Z Z of Fig. 1.

In this drawing the letter $a$ designates a cylindrical casing preferably made of glass and clamped between an upper and lower cap $b$ respectively. Packing rings or gaskets $c$ placed between the upper, lower and side portions of the cylinder, prevent leakage and cushion the glass. The glass cylinder is used when the device is connected to a low pressure boiler, but when it is desired to connect to a high pressure boiler, the glass is interchanged for a brass or steel cylinder to withstand the increased pressure. The upper and lower cap is equipped with outlet and inlet pipes $d$, communicating with one or a series of low or high pressure boilers. The upper and lower caps $b$ also have threaded central bores $e$ and $f$ into which is screwed a tubular valve chamber $g$ having outlet ports $h$ forming radial slots in the wall for the liquid to pass through. The lower portion of the valve chamber is connected to a transverse passageway $i$ with a liquid inlet pipe $j$ leading from a reservoir or other water supply. When the upper cap $b$ is screwed on to the upper threaded end of the chamber it holds the casing and the chamber in perfect alinement. As indicated in Fig. 1, the bore $f$ is joined to the cap by a transverse web of about the same diameter as the bore so as to give adequate space between the wall of the cap and the web for the liquid to flow.

In the chamber $g$ is arranged a sliding needle valve $k$ adapted at certain times to coact with an inlet $m$ located below the valve. The valve has a stem of larger diameter to form a shoulder $o$, the function of which will be hereinafter explained.

A socket $n$ in the stem permits the needle valve to swivel and thus line it for its seat. A coiled spring $p$ is mounted on the upper portion of the stem of the valve, and it can be compressed or tensioned by means of a screw sleeve $q$ in engagement with a threaded upper interior part of the valve chamber.

A series of levers or detents $r$ are swingingly mounted on a sleeve $s$ fitted to the lower part of the valve chamber. The sleeve is provided with radial arms or extensions $t$ to limit the downward movement of the levers. On the tops of the levers is supported a float including a number of annular buoyant members $u$ loosely mounted on a sleeve $v$ having upper and lower disks $w$, the upper disk being adjustable relative to the sleeve as shown to clamp the buoyant members together. The sleeve can freely slide up or down on the tubular chamber, and it comprehends a channel $x$ for the liquid to pass through from the openings $h$ in the valve chamber.

A safety disk valve 15 is mounted in each of the caps $b$, each valve being normally held open by a spring 16 which is mounted on the stem of the valve. These valves will shut when the casing $a$ or any of the valve mechanism breaks, by the pressure of the steam from above and below.

It will be noted, that when the cock at the inlet pipe $j$ is open the water will flow into the casing or float chamber through the medium of the opening $m$ and outlets $h$ in the valve chamber. The float then begins to rise, releasing the pressure on the detents, and the spring will force the needle valve downward onto its seat to close the inlet $m$. The water in the float chamber will then pass through the lower pipe $d$ to circulate in one or a series of boilers.

As shown in the drawing, one end of the passage $i$ is fitted with a blow off cock 17, to normally close the end of the passage. When it is desired to flush the valve and its seat, to remove mud or other matter, the blow off cock is opened and the inlet $j$ is opened to admit water under pressure which forces the sediment or other matter in a straight continuous line from the side of the cap.

I claim:

1. A feed water regulator comprising a casing having an outlet, a chamber having an inlet and communicating with the casing, a spring controlled valve arranged in the chamber to coact with the inlet, a float slidingly mounted on the chamber, and detents supporting the float and engaging the valve for normally holding it open.

2. A feed water regulator comprising a casing having an outlet, a chamber having an inlet and communicating with the casing, a spring controlled valve arranged in the chamber to coact with the inlet, a series of floats slidingly mounted on the chamber, and detents supporting the floats and engaging the valve for normally holding it open.

3. A feed water regulator comprising a casing having an outlet, a chamber having an inlet and communicating with the casing, a spring controlled needle valve arranged in the chamber to coact with the inlet, a sleeve slidingly mounted on the chamber, a series of annular floats clamped on the sleeve, and detents supporting the floats and engaging the valve for normally holding it open.

4. A feed water regulator comprising a casing having an inlet and outlets, a chamber having an inlet passage communicating with the casing, a spring controlled needle valve arranged in the chamber to coact with the inlet passage, a float slidingly mounted in the chamber, detents supporting the float and engaging the valve for normally holding it open, said inlet also leading in a continuous straight line to one of the outlets in the casing.

5. In a feed water regulator the combination with a sleeve, of a series of tubes clamped to the sleeve.

In testimony whereof I have hereunto set my hand in the presence of two subscribing witnesses.

THOMAS KEENAN.

Witnesses:
WILLIAM MILLER,
JOHN A. BERGSTROM.

Copies of this patent may be obtained for five cents each, by addressing the "Commissioner of Patents, Washington, D. C."